US011170786B1

United States Patent
Liao et al.

(10) Patent No.: US 11,170,786 B1
(45) Date of Patent: Nov. 9, 2021

(54) FEDERATED SPEAKER VERIFICATION METHOD BASED ON DIFFERENTIAL PRIVACY

(71) Applicant: Harbin Institute of Technology (Shenzhen) (Shenzhen Institute of Science and Technology Innovation, Harbin Institute of Technology), Guangdong (CN)

(72) Inventors: Qing Liao, Guangdong (CN); Yangqian Wang, Guangdong (CN); Yang Liu, Guangdong (CN); Lin Jiang, Guangdong (CN); Xuan Wang, Guangdong (CN); Ye Wang, Guangdong (CN)

(73) Assignee: Harbin Institute of Technology (Shenzhen) (Shenzhen Institute of Science and Technology Innovation, Harbin Institute of Technology), Shenzhen (CN)

( * ) Notice: Subject to any disclaimer, the term of this patent is extended or adjusted under 35 U.S.C. 154(b) by 0 days.

(21) Appl. No.: 17/334,790

(22) Filed: May 30, 2021

(30) Foreign Application Priority Data

Sep. 4, 2020 (CN) .......................... 202010920024.4

(51) Int. Cl.
*G10L 17/06* (2013.01)
*G06N 20/00* (2019.01)
(Continued)

(52) U.S. Cl.
CPC .............. *G10L 17/06* (2013.01); *G06N 20/00* (2019.01); *G10L 17/02* (2013.01); *G10L 17/04* (2013.01)

(58) Field of Classification Search
CPC ......... G10L 17/06; G10L 17/04; G10L 17/02; G06N 20/00
(Continued)

(56) References Cited

U.S. PATENT DOCUMENTS

| 9,865,266 B2 * | 1/2018 | Colibro .................. G10L 17/04 |
| 2014/0244257 A1 * | 8/2014 | Colibro .................. G10L 17/12 |
| | | 704/246 |

(Continued)

FOREIGN PATENT DOCUMENTS

| CN | 101997689 A | 3/2011 |
| CN | 102270451 A | 12/2011 |

(Continued)

OTHER PUBLICATIONS

Manas A. Pathak et al., Privacy-Preserving Speaker Verification and Identification Using Gaussian Mixture Models, IEEE Transactions on Audio, Speech, and Language Processing, Feb. 2013, pp. 397-406, vol. 21, No. 2.

(Continued)

*Primary Examiner* — Edwin S Leland, III

(57) ABSTRACT

The present disclosure proposes a federated speaker verification method based on differential privacy, including: 1. performing, by a server, UBM pre-training to obtain an initial UBM; 2. receiving, by the client, the pre-trained initial UBM, and performing initial UBM learning based on local private speech data; 3. performing, by the client, differential privacy protection based on learned statistics; 4. aggregating, by the server, statistics uploaded by multiple clients, and updating the initial UBM; and 5. receiving, by the client, the updated UBM, performing adjustment based on the local private speech data to obtain a GMM for a user (Continued)

of the client, and determining, based on the updated UBM and the GMM, whether a to-be-verified speech is generated by the user of the client.

6 Claims, 1 Drawing Sheet

(51) Int. Cl.
*G10L 17/04* (2013.01)
*G10L 17/02* (2013.01)

(58) Field of Classification Search
USPC .......................................................... 704/244
See application file for complete search history.

(56) References Cited

U.S. PATENT DOCUMENTS

| | | | | |
|---|---|---|---|---|
| 2015/0347734 | A1* | 12/2015 | Beigi | G06F 21/32 713/155 |
| 2016/0155020 | A1* | 6/2016 | Tariq | G06K 9/6215 382/105 |
| 2019/0244622 | A1* | 8/2019 | Borkar | G10L 17/16 |
| 2019/0341041 | A1* | 11/2019 | Xie | G10L 17/06 |
| 2021/0201919 | A1* | 7/2021 | Borkar | G06F 17/16 |

FOREIGN PATENT DOCUMENTS

| | | |
|---|---|---|
| CN | 102543084 A | 7/2012 |
| CN | 103730114 A | 4/2014 |
| CN | 105069874 A | 11/2015 |
| CN | 106685993 A | 5/2017 |
| CN | 106847292 A | 6/2017 |
| CN | 107222851 A | 9/2017 |
| CN | 108234493 A | 6/2018 |
| CN | 108922544 A | 11/2018 |
| CN | 111027715 A | 4/2020 |
| CN | 111046433 A | 4/2020 |
| CN | 111460494 A | 7/2020 |

OTHER PUBLICATIONS

Xiaoyu Zhang et al., An Analysis of Intelligent Acoustic System Security, Frontiers of Data and Computing, Dec. 2019, pp. 98-109, vol. 1, No. 2.
Lianglei Li et al., The Scheme of Open Authorization Based on FIDO UAF, Netinfo Security, Jun. 10, 2017, pp. 35-42, vol. 6.
Xixi Huang et a., Differentially Private Convolutional Neural Networks with Adaptive Gradient Descent, 2019 IEEE Fourth International Conference on Data Science in Cyberspace (DSC), Dec. 31, 2019, pp. 642-648.
Manas A. Pathak et al., Privacy-Preserving Speaker Verification as Password Matching, 2012 IEEE International Conference on Acoustics, Speech and Signal Processing, 2012, pp. 1849-1852.
Yogachandran Rahulamathavan et al., Privacy-preserving iVector based Speaker Verification, IEEE/ACM Transactions on Audio, Speech, and Language Processing, 2019, pp. 496-506, vol. 27, No. 3.

* cited by examiner

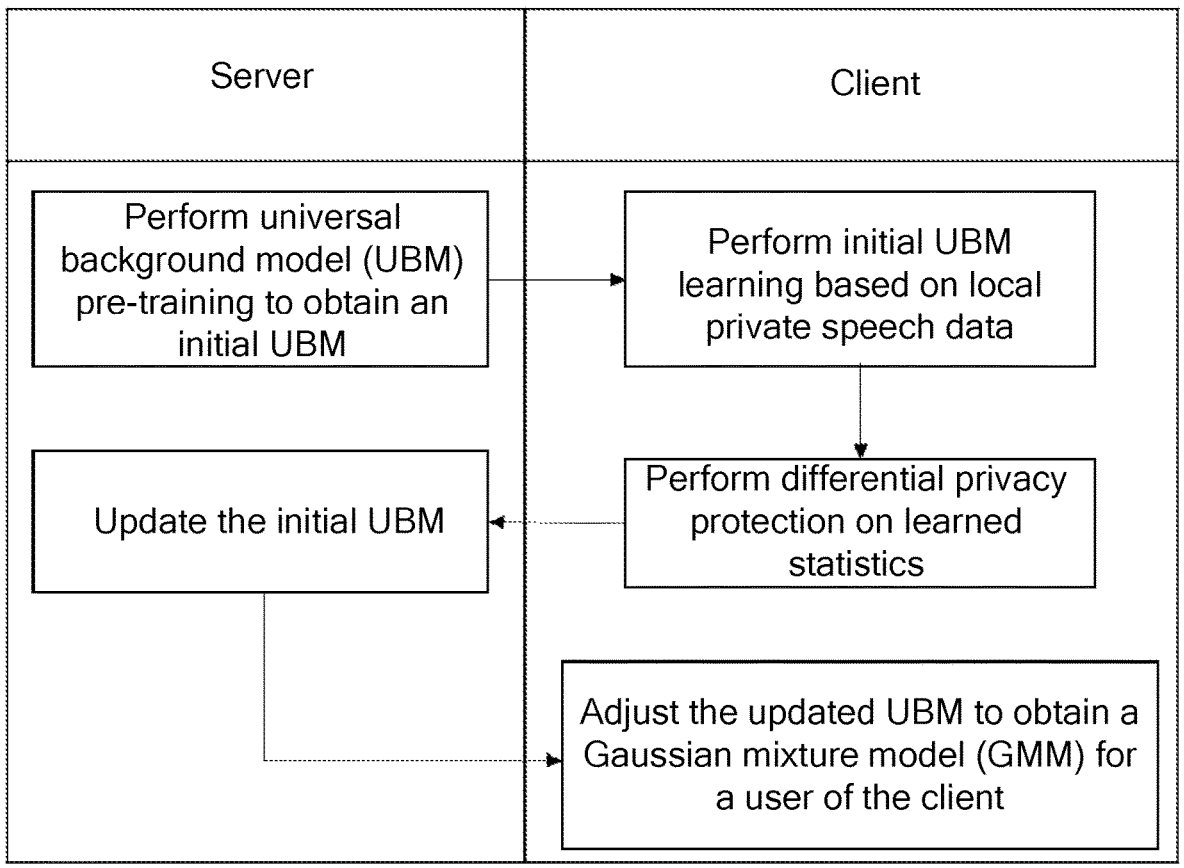

FEDERATED SPEAKER VERIFICATION METHOD BASED ON DIFFERENTIAL PRIVACY

CROSS REFERENCE TO RELATED APPLICATIONS

The present application claims the benefit of Chinese Patent Application No. 202010920024.4 filed on Sep. 4, 2020, the contents of which are incorporated herein by reference in their entirety.

TECHNICAL FIELD

The present disclosure relates to a federated speaker verification method based on differential privacy, and belongs to application of differential privacy and federated learning in the field of speaker verification.

BACKGROUND

A voiceprint is a set of speech features contained in a speech that can characterize and identify a speaker, and speech models established based on these features (parameters). Speaker verification is a process of identifying, based on voiceprint features of a to-be-verified speech, a speaker corresponding to the speech. Similar to fingerprint recognition, speech features and pronunciation habits contained in each person's speech process are almost unique. Even when imitating others, a speaker can hardly change his or her most essential pronunciation characteristics and vocal tract characteristics.

Due to the advantages of speech, such as easy use, low equipment cost, and support for remote authentication, speaker verification can be applied to all scenarios that require identity authentication, such as access control systems and the fields of financial securities, public security and justice, military, and secure payment. In short, speaker verification has been developing into one of the most reliable and safest biometric recognition technologies in work and life, with unlimited application scenarios and huge potentials.

However, with the popularization of the speaker verification technology, security of voiceprint features has received widespread attention from experts and scholars at home and abroad. Like other biometric information, voiceprint features are unique and last a lifetime. Once the voiceprint features are stolen by others, issues related to personal information, life and property security may arise, and a large amount of in-depth information may be mined and disclosed, causing substantial material and spiritual damage to users. Like other biometric recognition technologies, speaker verification requires a large amount of user speech data to train a speaker verification model. Speaker verification adopts a typical client/server (C/S) mode. When users use speaker verification services provided by service providers, to obtain higher recognition accuracy, they usually need to upload their speech data to servers for training models and registering their speaker models. Since the user data is stored on servers, the risk of leaking user private data is greatly increased. Once users' voiceprint features are leaked due to malicious attacks on the servers or management issues, this will have a serious impact on users and even the entire biometric identification industry. In order to protect users' private information, many countries have issued corresponding privacy protection regulations, such as General Data Protection Regulation and Cyber Security Law proposed by European Union and China. All these regulations explicitly prohibit centralized collection and use of users' private data. Therefore, with the improvement of privacy protection regulations and the growing awareness of the public for privacy protection, speaker verification models will face the challenges of data scarcity and privacy leakage.

The existing privacy protection schemes for speaker verification use homomorphic encryption to protect user private information at the registration and verification stages of speaker verification.

(1) Working Process of a Speaker Verification System:

Speaker verification adopts a typical C/S mode. Unlike image and text classification models, the working process of the speaker verification system can be divided into the following three main stages:

Stage 1: universal background model (UBM) training. The speaker verification system needs to use a large amount of speech data from different users to train a UBM that can reflect distribution of universal speech features.

Stage 2: registration stage. If a user wants to use the speaker verification service, the user needs to provide speech data of a specific duration as registration data. The speaker verification system uses the registration data provided by the user to adjust the UBM to obtain a speaker model for the user.

Stage 3: verification stage. For a user who has completed the registration, a registered speaker model can be used to verify whether a speech is generated by the user.

(2) Speaker Verification Model Based on Gaussian Mixture Model-Universal Background Model (GMM-UBM):

The following first describes the basic working process of a GMM-UBM based text-related speaker verification model. In this framework, likelihood estimation is used to verify a speaker. In this framework, each user is represented as a Gaussian mixture model (GMM), which is obtained by adjusting a UBM that can reflect the distribution of universal speaker features. The UBM is also a GMM essentially, but needs to be trained with a large amount of speech data from different users. By contrast, a GMM can be obtained simply by adjusting the UBM based on registered speech data of a specific user.

(3) Homomorphic Encryption:

Homomorphic encryption is a form of encryption that performs a specific form of algebraic operation on ciphertext, where a result obtained is still encrypted. A result obtained by decrypting the encrypted result obtained by the algebraic operation is the same as the result obtained by directly performing the same algebraic operation on the ciphertext. Homomorphic encryption can truly protect data confidentiality when data and its operations are entrusted to a third party. Therefore, homomorphic encryption can well protect private data in C/S service mode. Homomorphic encryption can be expressed as follows:

$$x_1, x_2, \ldots, x_n \rightarrow [x_1], [x_2], \ldots, [x_n]$$

$$f([x_1], [x_2], \ldots, [x_n]) \rightarrow [f(x_1, x_2, \ldots, x_n)]$$

[•] represents encryption operation, and f[•] represents algebraic operation.

Privacy protection in the field of speaker verification is in its infancy, and only some schemes are under research, mainly including the following three types: A first scheme encrypts user private data by using algorithms such as cryptographic homomorphic encryption and secure multiparty computation (Manas A Pathak and Bhiksha Raj. 2012. Privacy-preserving speaker verification and identification using gaussian mixture models. IEEE Transactions on Audio, Speech, and Language Processing 21, 2 (2012), 397-406). A second scheme is based on hashing (Manas A Pathak and Bhiksha Raj. 2012. Privacy-preserving speaker verification as password matching. In 2012 IEEE International Conference on Acoustics, Speech and Signal Processing. 1849-1852), and uses a hash function to map vector representation of a user into a random sequence. A third scheme is based on the randomization technology in information theory (Yogachandran Rahulamathavan, Kunaraj R. Sutharsini, Indranil Ghosh Ray, Rongxing Lu, and Muttukrishnan Rajarajan. 2019. Privacy-Preserving iVector-Based Speaker Verification. IEEE/ACM Transactions on Audio, Speech, and Language Processing 27, 3 (2019), 496-506), and uses uniformly distributed random numbers as keys to randomize the representation of private features.

Disadvantages of the Prior Art (1) The method based on cryptography is complex in computation, which requires devices to have strong computing capability.
(2) The method based on hashing reduces the recognition accuracy of models.
(3) The method based on randomization requires multiple interactions between a client and a server, which requires high network stability.

In addition, none of the existing methods can train a speaker verification model with better representation capabilities while protecting users' private data.

SUMMARY

The present disclosure proposes a federated speaker verification method based on differential privacy, to train a UBM for speaker verification while protecting user private data. The specific technical solutions are as follows:

A federated speaker verification method based on differential privacy includes the following steps:

step 1: performing, by a server, UBM pre-training to obtain an initial UBM, and sending the initial UBM to a client;

step 2: receiving, by the client, the initial UBM, and performing initial UBM learning based on local private speech data;

step 3: performing, by the client, differential privacy protection on statistics learned in step 2, and uploading the statistics to the server;

step 4: aggregating, by the server, statistics uploaded by multiple clients, updating the initial UBM, and sending the updated UBM to the client; and step 5: receiving, by the client, the updated UBM, performing adjustment based on local speech data to obtain a GMM for a user of the client, and determining, based on the updated UBM and the GMM, whether a to-be-verified speech is generated by the user of the client.

Preferably, in step 1, the initial UBM is a UBM capable of fitting universal speech features, and is obtained by the server through pre-training based on an open-source data set by using an EM algorithm.

Preferably, in step 2, a learning process for the initial UBM is as follows:

representing the initial UBM as $\lambda=\{w_j, \mu_j, \sigma_j\}$, where $j=1, \ldots, M$, M represents a quantity of Gaussian components in the initial UBM, and $w_j$, $\mu_j$, and $\sigma_j$ represent a weight, a mean vector, and a covariance matrix of the j-th Gaussian component in the UBM, respectively;

calculating a probability that the t-th component $x_t$ of a speech feature appears on the c-th Gaussian component of the initial UBM:

$$r_{c,t} = \frac{w_c N(x_t \mid \mu_c, \sigma_c)}{\sum_{j=1}^{M} w_j N(x_t \mid \mu_j, \sigma_j)} \quad (1)$$

using $r_{c,t}$ to calculate statistics $r_c$ and $z_c$:

$$r_c = \sum_{t=1}^{T} r_{c,t}[1] \quad (2)$$

$$z_c = \sum_{t=1}^{T} r_{c,t} x_t \quad (3)$$

where [1] represents a vector with all elements being 1, and T represents a total length of the speech feature.

Further, in step 3, a specific method for performing differential privacy protection on the learned statistics by the client is: using differential privacy of the Laplace mechanism to add noise, where a method for adding noise Y is:

$$r'_{c,t} = r_{c,t} + Y \quad (4)$$

where $$Y \sim Laplace\left(\frac{s(r_{c,t})}{\varepsilon}\right),$$

and a global sensitivity of $$r_{c,t} \text{ is } s(r_{c,t}) = 1;$$

and using $r'_{c,t}$ to separately calculate the statistics $r'_c$ and $z'_c$, and uploading the statistics to the server.

Further, in step 4, a method for updating the initial UBM is: using maximum a posterior (MAP) estimation to update the initial UBM based on the statistics $r'_c$ and $z'_c$ uploaded by the client to the server, where the server first needs to aggregate the statistics $r'_c$ and $z'_c$ uploaded by multiple clients:

$$\overline{r_c} = \sum_{i=1}^{K} r'^i_c \quad (5)$$

$$\overline{z_c} = \sum_{i=1}^{K} z'^i_c \quad (6)$$

where K represents a quantity of clients participating in the initial UBM updating; and updating the initial UBM based on $\overline{r_c}$ and $\overline{z_c}$ to obtain the updated UBM, where the initial UBM is represented as $UBM_0$, the updated UBM is represented as $\overline{UBM}$, and a formula for updating a mean vector of the c-th Gaussian component is:

$$\mu_c^{UBM} = \frac{\overline{z_c} + \frac{\sigma_c^{UBM_0}}{\sigma'_{UBM}}\mu_c^{UDM_0}}{\overline{r_c} + \frac{\sigma_c^{UBM_0}}{\sigma'_{UBM}}} \quad (7)$$

where $\sigma'_{UBM}$ represents a prior of the mean vector of the initial UBM, $\sigma_c^{UBM_0}$ represents a covariance matrix of the c-th Gaussian component of the $UBM_0$, $\mu_c^{UBM_0}$ represents a mean vector of the c-th Gaussian component of the $UBM_0$.

Further, in step 5, the formula for adjusting a mean vector of the updated UBM to obtain the GMM is:

$$\mu_c^{SPK} = \frac{\overline{z_c} + \frac{\sigma_c^{UBM}}{\sigma'_{SPK}}\mu_c^{UBM}}{\overline{r_c} + \frac{\sigma_c^{UBM}}{\sigma'_{SPK}}} \quad (8)$$

where $\sigma'_{SPK}$ represents a prior for a mean vector of a GMM for a user; $\sigma_c^{\overline{UBM}}$ represents a covariance matrix of the c-th Gaussian component of the $\overline{UBM}$; $\mu_c^{\overline{UBM}}$ represents a mean vector of the c-th Gaussian component of the $\overline{UBM}$; and the client can directly use the GMM to calculate a likelihood ratio to determine whether the to-be-verified speech is generated by the user of the client.

The present disclosure can solve both the data scarcity problem and privacy protection problem, with low computation overheads and few client-server interactions.

BRIEF DESCRIPTION OF THE DRAWINGS

The sole FIGURE is a flowchart of a federated speaker verification method based on differential privacy according to the present disclosure.

DETAILED DESCRIPTION

The following clearly and completely describes the technical solutions in the embodiments of the present disclosure with reference to accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The present disclosure provides a federated speaker verification method based on differential privacy. This method ensures that user speech data is not uploaded to a server, but is exchanged through some model parameters, so as to protect user private information. In addition, to further protect the user private information, differential privacy is used to add noise to the exchanged parameters to ensure that the user private data is not reconstructed by malicious attackers through attack methods such as inversion attacks. This method is constructed based on GMM-UBM. The present disclosure is inspired by federated learning. In the federated learning framework, a central node coordinates and manages multiple client nodes, and uses data of all the client nodes to jointly train or construct a machine learning model that does not leak user private information. The purpose of the present disclosure is to learn a UBM that can characterize universal speech features of a speaker in a working environment.

As shown in the sole FIGURE, a federated speaker verification method based on differential privacy includes the following steps:

Step 1: A server performs UBM re-training to obtain an initial UBM, and sends the initial UBM to a client, where the initial UBM is a UBM capable of fitting universal speech features, and is obtained by the server through pre-training based on an open-source data set by using an expectation maximization (EM) algorithm, and speech data in the data set has relatively small privacy attributes.

Step 2: The client receives the pre-trained initial UBM, and performs initial UBM learning based on local private speech data, where a learning process for the initial UBM is as follows:

representing the initial UBM as $\lambda = \{w_j, \mu_j, \sigma_j\}$, where $j=1, \ldots, M$, M represents a quantity of Gaussian components in the initial UBM, and $w_j$, $\mu_j$, and $\sigma_j$ represent a weight, a mean vector, and a covariance matrix of the j-th Gaussian component in the UBM, respectively;

calculating a probability that the t-th component $x_t$ of a speech feature appears on the c-th Gaussian component of the initial UBM:

$$r_{c,t} = \frac{w_c N(x_t \mid \mu_c, \sigma_c)}{\sum_{j=1}^{M} w_j N(x_t \mid \mu_j, \sigma_j)} \quad (1)$$

using $r_{c,t}$ to calculate statistics $r_c$ and $z_c$:

$$r_c = \sum_{t=1}^{T} r_{c,t}[1] \quad (2)$$

$$z_c = \sum_{t=1}^{T} r_{c,t} x_t \quad (3)$$

where [1] represents a vector with all elements being 1, and T represents a total length of the speech feature. When no differential privacy protection is added, $r_c$ and $z_c$ can be directly uploaded to a central node.

Step 3: A client node performs differential privacy protection on the statistics learned in Step 2 and uploads the statistics to the server. Since the statistics $r_c$ and $z_c$ are highly related to the user's private speech data, directly uploading the statistics $r_c$ and $z_c$ to the server may lead to leakage of the user's private information. Therefore, the differential privacy mechanism needs to be used to add noise to prevent user data from being stolen. A specific method for performing differential privacy protection on the learned statistics by the client is: using differential privacy of the Laplace mechanism to add noise, where a method for adding noise Y is:

$$r'_{c,t} = r_{c,t} + Y \quad (4)$$

where $$Y \sim Laplace\left(\frac{x(r_{c,t})}{\varepsilon}\right),$$

and a global sensitivity of $r_{c,t}$ is $s(r_{c,t})=1$ and using $r'_{c,t}$ to separately calculate the statistics $r'_c$ and $z'_c$, and uploading the statistics to the server. Since Y satisfies $(\varepsilon,0)$–DP, it can be determined based on the parallel theorem of differential privacy that both the statistics $r'_c$ and $z'_c$ satisfy the differential privacy protection. The differential privacy protection can effectively prevent malicious attackers from deriving user-related information from parameters uploaded by the client.

Step 4: The server aggregates statistics uploaded by multiple clients for differential privacy protection, updates the initial UBM to obtain the updated UBM, and sends the updated UBM to the client, where a method for updating the initial UBM is: using MAP estimation to update the initial UBM based on the statistics $r'_c$ and $z'_c$ uploaded by the client to the server, where the server first needs to aggregate the statistics $r'_c$ and $z'_c$ uploaded by multiple clients:

$$\bar{r}_c = \sum_{i=1}^{K} r_c^{'i} \tag{5}$$

$$\bar{z}_c = \sum_{i=1}^{K} z_c^{'i} \tag{6}$$

where K represents a quantity of clients participating in the initial UBM updating; and updating the initial UBM based on $\bar{r}_c$ and $\bar{z}_c$ to obtain the updated UBM, where the initial UBM is represented as $UBM_0$, the updated UBM is represented as $\overline{UBM}$, and a formula for updating a mean vector of the c-th Gaussian component is:

$$\mu_c^{\overline{UBM}} = \frac{\bar{z}_c + \frac{\sigma_c^{UBM_0}}{\sigma'_{UBM}}\mu_c^{UDM_0}}{\bar{r}_c + \frac{\sigma_c^{UBM_0}}{\sigma'_{UBM}}} \tag{7}$$

where $\sigma'_{UBM}$ represents a prior of the mean vector of the initial UBM, $$\sigma_c^{UBM_0}$$

represents a covariance matrix of the c-th Gaussian component of the $$UBM_0; \mu_c^{UBM_0}$$

represents a mean vector of the c-th Gaussian component of the $UMB_0$, and it can be determined based on the parallel theorem of differential privacy that the entire update process of the initial UBM satisfies $(\varepsilon,0)$–DP differential privacy.

Step 5: The client receives the updated UBM, and adjusts a mean vector of the updated UBM to obtain a GMM for a user of the client, where the updating formula is:

$$\mu_c^{SPK} = \frac{\bar{z}_c + \frac{\sigma_c^{UBM}}{\sigma'_{SPK}}\mu_c^{UBM}}{\bar{r}_c + \frac{\sigma_c^{UBM}}{\sigma'_{SPK}}} \tag{8}$$

where $\sigma'_{SPK}$ represents a prior for a mean vector of a GMM for a user;

$$\sigma_c^{UBM}$$

represents a covariance matrix of the c-th Gaussian component of the $$\overline{UBM}; \mu_c^{UBM}$$

represents a mean vector of the c-th Gaussian component of the $\overline{UBM}$.

The speaker performs GMM learning on the client, and the client can directly use the GMM to calculate a likelihood ratio to determine whether a to-be-verified speech is generated by a user of the client.

Although the present disclosure has been described in detail with reference to the aforementioned embodiments, those skilled in the art can still modify the technical solutions described in the aforementioned embodiments, or substitute some of the technical features of the embodiments. Any modifications, equivalent substitutions, improvements, etc. within the spirit and scope of the present disclosure are intended to be included in the claimed scope of the present disclosure.

The invention claimed is:

1. A federated speaker verification method based on differential privacy, comprising the following steps:
   step 1: performing, by a server, universal background model (UBM) pre-training to obtain an initial UBM, and sending the initial UBM to a client;
   step 2: receiving, by the client, the initial UBM, and performing initial UBM learning based on local private speech data;
   step 3: performing, by the client, differential privacy protection on statistics learned in step 2, and uploading the statistics to the server;
   step 4: aggregating, by the server, statistics uploaded by multiple clients, updating the initial UBM, and sending the updated UBM to the client; and
   step 5: receiving, by the client, the updated UBM, performing adjustment based on local speech data to obtain a Gaussian mixture model (GMM) for a user of the client, and determining, based on the updated UBM and the GMM, whether a to-be-verified speech is generated by the user of the client.

2. The federated speaker verification method based on differential privacy according to claim 1, wherein in step 1, the initial UBM is a UBM capable of fitting universal speech features, and is obtained by the server through pre-training based on an open-source data set by using an expectation maximization (EM) algorithm.

3. The federated speaker verification method based on differential privacy according to claim 1, wherein in step 2, a learning process for the initial UBM is as follows:

representing the initial UBM as $\lambda=\{w_j, \mu_j, \sigma_j\}$, wherein $j=1, \ldots, M$, M represents a quantity of Gaussian components in the initial UBM, and $w_j$, $\mu_j$, and $\sigma_j$ represent a weight, a mean vector, and a covariance matrix of the j-th Gaussian component in the UBM, respectively;

calculating a probability that the t-th component $x_t$ of a speech feature appears on the c-th Gaussian component of the initial UBM:

$$r_{c,t} = \frac{w_c N(x_t \mid \mu_c, \sigma_c)}{\sum_{j=1}^{M} w_j N(x_t \mid \mu_j, \sigma_j)} \quad (1)$$

using $r_{c,t}$ to calculate statistics $r_c$ and $z_c$:

$$r_c = \sum_{t=1}^{T} r_{c,t}[1] \quad (2)$$

$$z_c = \sum_{t=1}^{T} r_{c,t} x_t \quad (3)$$

wherein [1] represents a vector with all elements being 1, and T represents a total length of the speech feature.

4. The federated speaker verification method based on differential privacy according to claim 3, wherein in step 3, a specific method for performing differential privacy protection on the learned statistics by the client is: using differential privacy of the Laplace mechanism to add noise, wherein a method for adding noise Y is:

$$r'_{c,t} = r_{c,t} + Y \quad (4)$$

wherein $$Y \sim Laplace\left(\frac{s(r_{c,t})}{\varepsilon}\right),$$

and a global sensitivity of $r_{c,t}$ is $s(r_{c,t})=1$; and using $$r'_{c,t}$$

to separately calculate the statistics $r'_c$ and $z'_c$, and uploading the statistics to the server.

5. The federated speaker verification method based on differential privacy according to claim 4, wherein in step 4, a method for updating the initial UBM is: using maximum a posterior (MAP) estimation to update the initial UBM based on the statistics $r'_c$ and $z'_c$ uploaded by the client to the server, wherein the server first needs to aggregate the statistics $r'_c$ and $z'_c$ uploaded by multiple clients:

$$\overline{r_c} = \sum_{i=1}^{K} r'^i_c \quad (5)$$

$$\overline{z_c} = \sum_{i=1}^{K} z'^i_c \quad (6)$$

wherein K represents a quantity of clients participating in the initial UBM updating; and updating the initial UBM based on $\overline{r_c}$ and $\overline{z_c}$ to obtain the updated UBM, wherein the initial UBM is represented as $UBM_0$, the updated UBM is represented as $\overline{UBM}$, and a formula for updating a mean vector of the c-th Gaussian component is:

$$\mu_c^{\overline{UBM}} = \frac{\overline{z_c} + \frac{\sigma_c^{UBM_0}}{\sigma'_{UBM}} \mu_c^{UBM_0}}{\overline{r_c} + \frac{\sigma_c^{UBM_0}}{\sigma'_{UBM}}} \quad (7)$$

Wherein $\sigma'_{UBM}$ represents a prior of the mean vector of the initial $$UBM, \sigma_c^{UBM_0}$$

represents a covariance matrix of the c-th Gaussian component of the $$UBM_0, \mu_c^{UBM_0}$$

represents a mean vector of the c-th Gaussian component of the $UBM_0$.

6. The federated speaker verification method based on differential privacy according to claim 5, wherein in step 5, a formula for adjusting a mean vector of the updated UBM to obtain the GMM is:

$$\mu_c^{SPK} = \frac{\overline{z_c} + \frac{\sigma_c^{UBM}}{\sigma'_{SPK}} \mu_c^{UBM}}{\overline{r_c} + \frac{\sigma_c^{UBM}}{\sigma'_{SPK}}} \quad (8)$$

wherein $\sigma'_{SPK}$ represents a prior for a mean vector of a GMM for a user; $\sigma_c^{\overline{UBM}}$ represents a covariance matrix of the c-th Gaussian component of the $\overline{UBM}$; $\mu_c^{\overline{UBM}}$ represents a mean vector of the c-th Gaussian component of the $\overline{UBM}$; and the client directly uses the GMM to calculate a likelihood ratio to determine whether the to-be-verified speech is generated by the user of the client.

* * * * *